(12) United States Patent
Wang

(10) Patent No.: US 11,559,162 B1
(45) Date of Patent: Jan. 24, 2023

(54) BEVERAGE EXTRACTION DEVICE

(71) Applicant: Rui Wang, Xiantao (CN)

(72) Inventor: Rui Wang, Xiantao (CN)

( * ) Notice: Subject to any disclaimer, the term of this patent is extended or adjusted under 35 U.S.C. 154(b) by 0 days.

(21) Appl. No.: 17/826,356

(22) Filed: May 27, 2022

(51) Int. Cl.
    *A47J 31/06*    (2006.01)
    *A47J 31/10*    (2006.01)

(52) U.S. Cl.
    CPC ........... *A47J 31/0615* (2013.01); *A47J 31/10* (2013.01)

(58) Field of Classification Search
    CPC .... A47J 31/56; A47J 31/5251; A47J 31/4439; A47J 31/057
    See application file for complete search history.

(56) References Cited

U.S. PATENT DOCUMENTS

| 11,167,976 | B2 | 11/2021 | Lin |
| 2012/0073448 | A1* | 3/2012 | Husted ................ A47J 31/0636 99/283 |
| 2020/0359826 | A1 | 11/2020 | Umana |

FOREIGN PATENT DOCUMENTS

| CN | 109528005 | A | | 3/2019 |
| CN | 211186878 | U | | 8/2020 |
| CN | 215533673 | U | * | 1/2022 |

* cited by examiner

*Primary Examiner* — Thien S Tran

(57) ABSTRACT

A beverage extraction device is provided, including a pot body, a cup body, a cup holder and a floating sealing structure; the pot body is provided with a cavity connected to an outside; an inner cavity of the cup body is set to form a material cavity, the cup body is set in the cavity, a bottom of the material cavity is connected to the cavity, and a first filter screen is provided at a connection; the cup holder is connected to a top of the cup body, the cup holder is provided with a cup holder air hole connected to the material cavity, and the cup holder is further provided with a pumping and filling mechanism connected to the cup holder air hole, the pumping and filling mechanism makes the material cavity form positive and negative pressure.

11 Claims, 5 Drawing Sheets

BEVERAGE EXTRACTION DEVICE

TECHNICAL FIELD

The present disclosure relates to a technical field of beverage making equipment, in particular to a beverage extraction device.

BACKGROUND ART

Beverage extraction technology is to extract coffee, tea or other beverages through direct drinking water. Traditional beverage extraction technology is generally immersion extraction, and this method usually takes a long time to extract. In order to shorten the extraction time, pumping and filling of air pump has appeared in the market to circulate the water flow and promote the full contact between the water flow and material powder or tea, so as to shorten the extraction time. In the prior art, the pumping and filling switching of the air pump is generally carried out according to a predetermined time. If the amount of material powder or tea added is large, the water level during pumping will be high, and the water may be directly sucked into the air pump, resulting in the damage of the air pump.

SUMMARY

The main purpose of the present disclosure is to solve the problem that the beverage extraction device in the prior art easily sucks water into the air pump.

The present disclosure provides a beverage extraction device, including:

a pot body, the pot body is provided with a cavity connected to an outside;

a cup body, an inner cavity of the cup body is set to form a material cavity, the cup body is set in the cavity, a bottom of the material cavity is connected to the cavity, and a first filter screen is provided at a connection;

a cup holder, the cup holder is connected to a top of the cup body, the cup holder is provided with a cup holder air hole connected to the material cavity, and the cup holder is further provided with a pumping and filling mechanism connected to the cup holder air hole, the pumping and filling mechanism makes the material cavity form positive and negative pressure;

a floating sealing structure, the floating sealing structure is arranged in the material cavity, the floating sealing structure floats up as a liquid level in the material cavity rises until the cup holder air hole is blocked, and the floating sealing structure slides down as the liquid level in the material cavity drops until there is a gap between the floating sealing structure and the cup holder air hole.

Further, a top of the material cavity is provided with a guide structure, the guide structure is provided with an accommodating cavity, the accommodating cavity is respectively connected to the cup holder air hole and the material cavity, and the floating sealing structure is movably arranged in the accommodation cavity up and down.

Further, the floating sealing structure includes a blocking member and a buoyancy member, the buoyancy member is movably arranged in the accommodating cavity up and down, the blocking member is connected to the buoyancy member, the blocking member blocks the cup holder air hole when floating with the buoyancy member, and there is a gap between the blocking member and the cup holder air hole when blocking member slides down with the buoyancy member.

Further, the guide structure is a cylinder, a bottom of the cylinder is provided with a limit protrusion extending to the accommodating cavity, and a side wall of the cylinder is provided with a notch connected to the accommodating cavity.

Further, the pumping and filling mechanism includes at least one pump body, the pump body is connected to the cup holder air hole, and the pump body makes the material cavity generate the positive and negative pressure.

Further, the pumping and filling mechanism includes a first pump body, a second pump body, a three-way pipe and a control mechanism, the first pump body includes a first air port and a second air port, the second pump body includes a third air port and a fourth air port, a first end of the three-way pipe is connected to the first air port, a second end of the three-way pipe is connected to the third air port, and a third end of the three-way pipe is connected to the cup holder air hole, the control mechanism controls one of the first pump body and the second pump body to start and controls one of the second air port and the fourth air port to block, when the control mechanism controls the start of the first pump body, the fourth air port is blocked, and when the control mechanism controls the start of the second pump body, the second air port is blocked.

Further, the control mechanism includes a driving mechanism, a first blocking mechanism and a second blocking mechanism;

the first blocking mechanism includes a first air nozzle, a first blocking sleeve and a first spring;

the first air nozzle is connected to the second air port;

the second blocking mechanism includes a second air nozzle, a second blocking sleeve and a second spring;

the second air nozzle is connected to the fourth air port;

the driving mechanism selectively drive the first blocking sleeve to slide toward the first air nozzle or drive the second blocking sleeve to slide toward the second air nozzle;

the first spring is connected between the first blocking sleeve and the first air nozzle;

the second spring is connected between the second blocking sleeve and the second air nozzle;

when the first blocking sleeve slides toward the first air nozzle, the first gas nozzle is blocked, the first spring is compressed, and the second spring is stretched to keep the second blocking sleeve away from the second air nozzle to make the second air nozzle in a ventilating state;

when the second blocking sleeve slides toward the second gas nozzle, the second gas nozzle is blocked, the second spring is compressed, and the first spring is stretched to keep the first blocking sleeve away from the first air nozzle to make the first air nozzle is the ventilating state.

Further, the driving mechanism includes a motor and a cam connected to a motor shaft, and one end of the cam away from an axis is defined as a distal end, and one end of the cam close to the axis is defined as a proximal end, and the first blocking sleeve and the second blocking sleeve are symmetrically abutted against both ends of the cam, and when the first blocking sleeve is abutted against the distal end, the second blocking sleeve is abutted against the proximal end, and when the first blocking sleeve is abutted against the proximal end, the second blocking sleeve is abutted against the distal end.

Further, the control mechanism further includes a first switch and a second switch, the first switch starts or closes the first pump body, the second switch starts or closes the second pump body, the first switch is arranged on a same side as the second blocking mechanism, the second switch is arranged on a same side as the first blocking mechanism, and the motor shaft is further connected to a rocker arm, when distal end of the cam is abutted against the first blocking sleeve, the rocker arm triggers the second switch to start the second pump body, and the first switch closes the first pump body at this time; when the distal end of the cam is abutted against the second blocking sleeve, the rocker arm triggers the first switch to start the first pump body, and the second switch closes the second pump body at this time.

Further, also including a second filter screen, the second filter screen is arranged in the material cavity, the second filter screen and the first filter screen are enclosed to form a first chamber, the second filter screen and a top of the material chamber is enclosed to form a second chamber.

Further, the second filter screen is snap-connected to the cup body.

Further, the first filter screen is threadedly connected to the cup body.

Further, the cup holder is threadedly connected to the cup body.

The beneficial effect of the present disclosure is that: a pot body, a cup body, a cup holder and a floating sealing structure are arranged, and the pot body is provided with a cavity connected to the outside; an inner cavity of the cup body is arranged to form a material cavity, the cup body is arranged in the cavity, the bottom of the material cavity is connected to the cavity, and a first filter screen is arranged at the connection. The cup holder is connected to the top of the cup body, and the cup holder is provided with a cup holder air hole connected to the material cavity. The cup holder is also provided with a pumping and filling mechanism connected to the cup holder air hole. The pumping and filling mechanism can form a positive and negative pressure in the material cavity. The floating sealing structure is arranged in the material cavity. The floating sealing structure can float up as a liquid level in the material cavity rises until the cup holder air hole is blocked, and the floating sealing structure can slide down as the liquid level in the material cavity drops until there is a gap between the floating sealing structure and the cup holder air hole. By setting the floating sealing structure floating up with the rise of the liquid level to block the cup holder air hole, the cup holder air hole can be automatically blocked when the liquid level is too high, so as to prevent the liquid from entering the pumping and filling mechanism, and when the liquid level drops, the floating sealing structure will automatically fall to form a gap with the cup holder air hole for gas circulation, which effectively avoids the problem of parts damage caused by the liquid entering the pumping and filling mechanism when the liquid level is too high, and improves the service life of the product.

Figure 1:
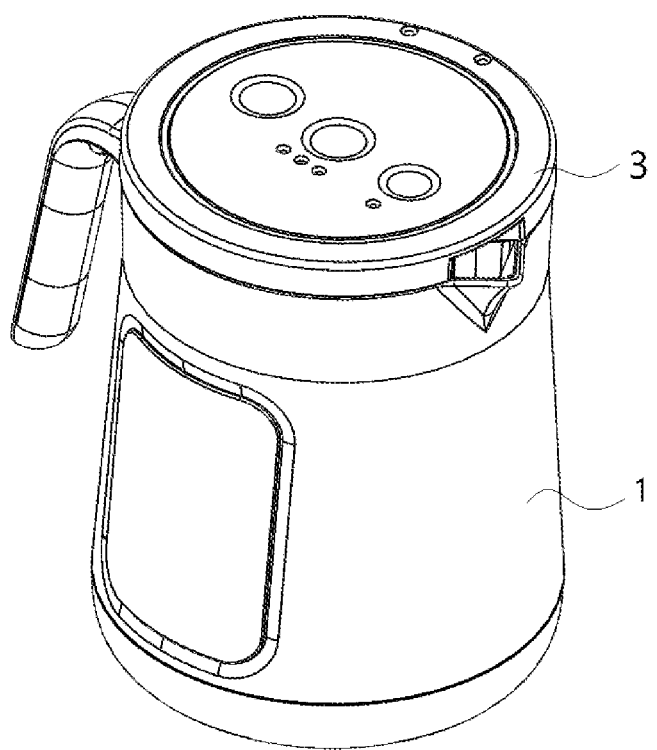
FIG. 1 is a structural diagram of an embodiment of the present disclosure.

Labels in the figures: pot body 1, cavity 10, cup body 2, material cavity 20, first filter screen 21, guide structure 22, limit protrusion 221, notch 222, cup holder 3, cup holder air hole 30, pumping and filling mechanism 4, first pump body 40, first air port 400, second air port 401, second pump body 41, third air port 410, fourth air port 411, three-way pipe 42, first end 420, second end 421, third end 422, driving mechanism 43, motor 430, cam 431, rocker arm 432, first switch 433, second switch 434, first blocking mechanism 44, first air nozzle 440, first blocking sleeve 441, first spring 442, second blocking mechanism 45, the second air nozzle 450, second blocking sleeve 451, second spring 452, floating sealing structure 5, blocking member 50, buoyancy member 51 and second filter screen 6.

DETAILED DESCRIPTION OF THE EMBODIMENTS

The technical solutions in the embodiments of the present disclosure will be clearly and completely described below with reference to the accompanying drawings in the embodiments of the present disclosure. Obviously, the described embodiments are only a part of the embodiments of the present disclosure, rather than all the embodiments. Based on the embodiments of the present disclosure, all other embodiments obtained by those of ordinary skill in the art without creative efforts shall fall within the protection scope of the present disclosure.

Referring to FIG. 1 to FIG. 5, an embodiment of the present disclosure discloses a beverage extraction device. The beverage extraction device includes a pot body 1, a cup body 2, a cup holder 3 and a floating sealing structure 5. The pot body 1 is provided with a cavity 10 connected to an outside. Specifically, the pot body 1 is provided with a spout, and the spout is configured to connect the external environment and the cavity 10. An inner cavity of the cup body 2 is set to form a material cavity 20, the cup body 2 is set in the cavity 10 of the pot body 1, a bottom of the material cavity 20 is connected to the cavity 10, and a first filter screen is provided at the connection. The cup holder 3 is connected to a top of the cup body 2, the cup holder 3 is provided with a cup holder air hole 30 connected to the material cavity 20, and the cup holder 3 is further provided with a pumping and filling mechanism 4 connected to the cup holder air hole 30, the pumping and filling mechanism 4 makes the material cavity 20 form positive and negative pressure. The floating sealing structure 5 is arranged in the material cavity 20, the floating sealing structure 5 can float up as a liquid level in the material cavity 20 rises until the cup holder air hole 30 is blocked, and the floating sealing structure 5 can slide down as the liquid level in the material cavity 20 drops until there is a gap between the floating sealing structure 5 and the cup holder air hole 30.

Based on the above structure, when the extraction device is used to extract beverages, raw materials (including but not limited to coffee powder or tea powder) are put into the material cavity 20, an appropriate amount of drinking water is added into the cavity 10 of the pot body 1. The liquid level of drinking water should reach the position where it is soaked into part of the material cavity 20 of the cup body 2, the pumping and filling mechanism 4 starts, and the pumping and filling mechanism 4 pumps or fills the material cavity 20 in a form of reciprocating alternation, so that the positive and negative pressure can be generated in the material cavity 20. When the pumping and filling mechanism 4 pumps air outside the material cavity 20, a negative pressure is generated in the material cavity 20, and the liquid in the cavity 10 of the pot body 1 is pressed into the material cavity 20. When the pumping and filling mechanism 4 fills air into the material cavity 20, a positive pressure is generated in the material cavity 20, and the water in the material cavity 20 is pressed into the cavity 10 of the pot body 1. Such a reciprocating cycle enables the liquid to flow back and forth between the material cavity 20 and the cavity 10 of the pot body 1, so as to promote the full contact between the raw material and the liquid and accelerate the extraction efficiency. If the pumping and filling mechanism 4 pumps too much air into the material cavity 20, or because too much raw material is added, the rising height of the liquid level may be too high. When the liquid level rises too high, the floating sealing structure 5 floats up to the sealing cup seat pore 30 with the rising of the liquid level, so as to prevent the liquid from entering the pumping and filling mechanism 4 and causing damage to the parts. When the pumping and filling mechanism 4 stops pumping air or fills into the material cavity 20 instead, the floating sealing structure 5 slides down as the liquid level in the cup body 2 drops until between the floating sealing structure 5 and the cup holder air hole 30, so that the cup seat air hole 30 can resume ventilation and resume normal operation.

By setting the floating sealing structure 5 that floats up with the rise of the liquid level to block the cup seat air hole 30, it can automatically float up to block the cup holder air hole 30 when the liquid level is too high to prevent the liquid from entering the pumping and filling mechanism 4, and automatically fall to a gap with the cup holder air hole 30 when the liquid level drops, so as to provide gas circulation, effectively avoid the problem of parts damage caused by the liquid entering the pumping and filling mechanism 4 when the liquid level is too high, and improve the service life of the product. At the same time, the floating sealing structure 5 uses buoyancy to automatically block the cup holder air hole 30, and automatically slides down by its own gravity, without the need for additional driving mechanisms, which not only ensures synergy, but also simplifies the structure and saves costs.

Further, in order to make the floating sealing structure 5 accurately block the cup holder air hole 30, the top of the material cavity 20 is provided with a guide structure 22, and the guide structure 22 is provided with an accommodating cavity. The accommodating cavity is connected to the cup holder air hole 30 and the material cavity 20 respectively. The floating sealing structure 5 is movably arranged in the accommodation cavity up and down. The floating sealing structure 5 can float up or down within a preset stroke through the restriction of the accommodating cavity, so as to accurately block the cup holder air hole 30.

Specifically, the floating sealing structure 5 includes a blocking member 50 and a buoyancy member 51. The buoyancy member 51 is movably arranged in the accommodation cavity up and down, and the blocking member 50 is connected to the buoyancy member 51. The blocking member 50 can block the cup holder air hole 30 when floating with the buoyancy member 51, and there can be a gap between the blocking member 50 and the cup holder air hole 30 when blocking member slides down with the buoyancy member 51.

Specifically, a lower end of the cup holder air hole 30 can be a conical hole, and the blocking member 50 is also a corresponding conical structure. When the buoyant member 51 floats up, the conical structure of the blocking member 50 is driven to insert into the conical hole of the cup holder air hole 30 to form a blocking. When the buoyant member 51 slides down, the blocking member 50 can be driven to slide down so that there is a gap between the blocking member 50 and the cup holder air hole 30. The conical structure can prevent the blocking member 50 from being subjected to resistance caused by contact with the inner wall of the cup holder air hole 30 during a sliding process.

Further, in order to prevent the buoyant member 51 from falling off the guide structure 22 when sliding down, causing to fail to align with the cup holder air hole 30 when it floats up next time, the guide structure 22 is a cylinder, and a bottom of the cylinder is provided with a limiting protrusion 221 extending toward the accommodating cavity. The limiting protrusion 221 can prevent the buoyancy member 51 from falling off the accommodating cavity. A side wall of the cylinder is provided with a notch 222 connected to the accommodating cavity. When the buoyant member 51 slides down, there is a gap between the buoyant member 51 and the cup holder air hole 30, so that the notch 222 is connected to the cup holder air hole 30 in time, so as to restore the ventilation state of the cup holder air hole 30.

Figure 3:
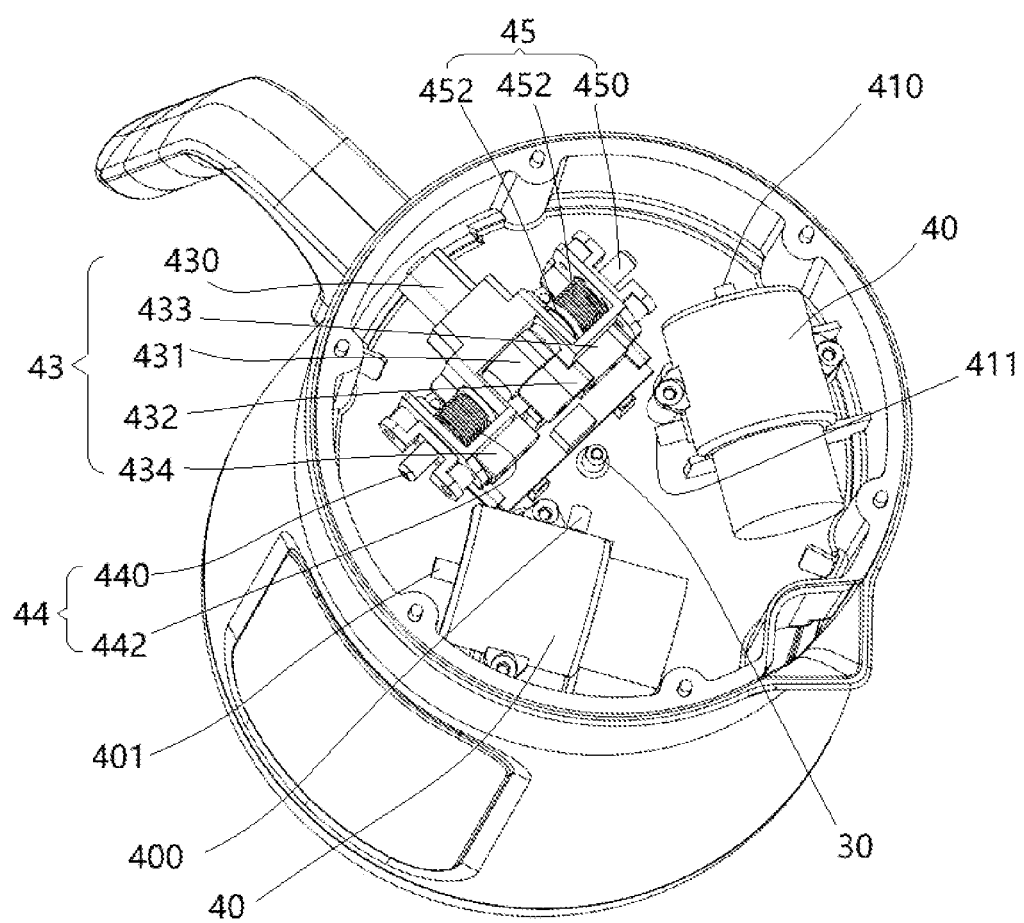
FIG. 3 is a structural diagram of a pumping and filling mechanism in an embodiment of the present disclosure, and flexible pipe and three-way pipe are not shown in the figure.
Figure 4:
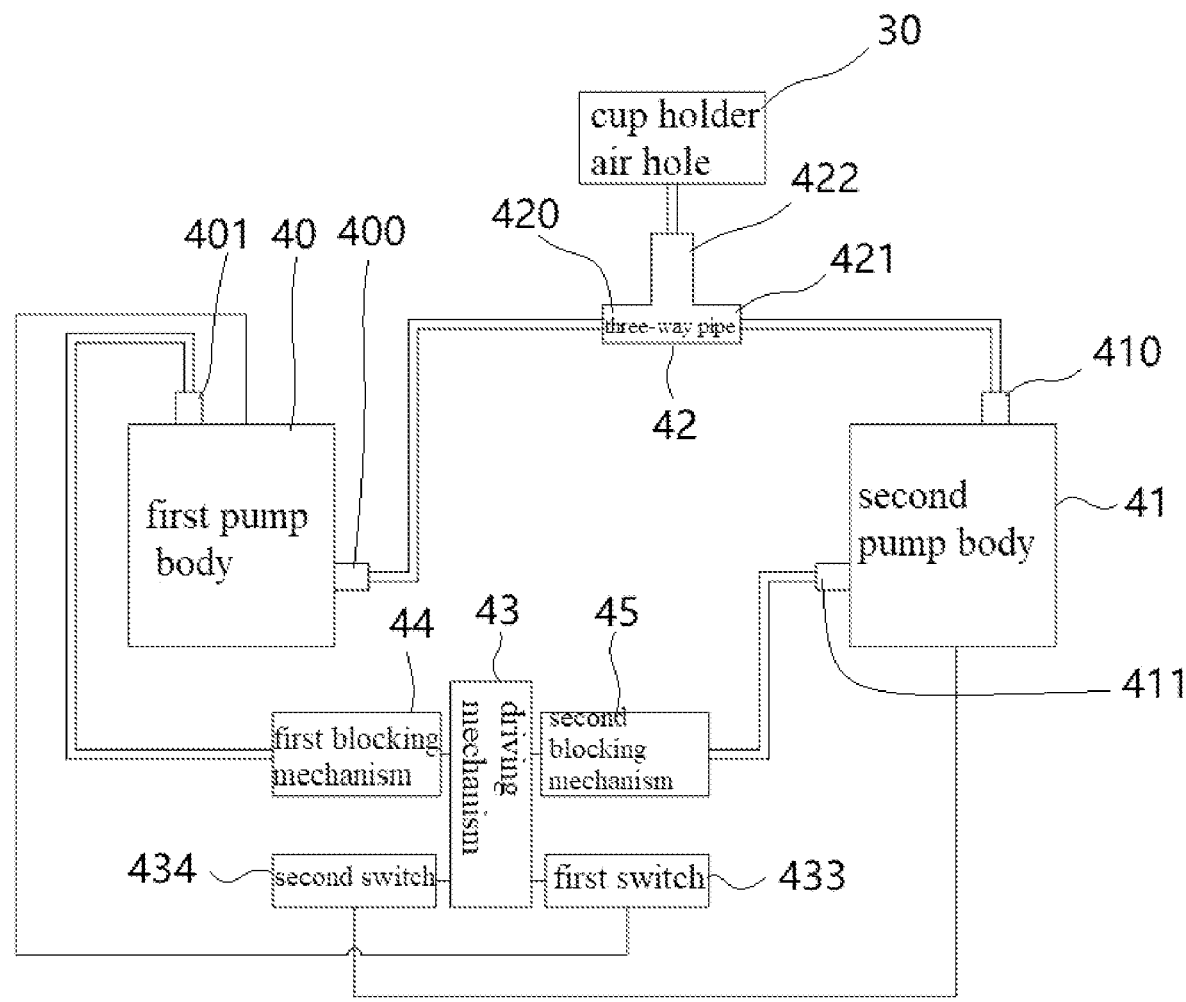
FIG. 4 is a schematic diagram of the pumping and filling mechanism in an embodiment of the present disclosure.
Figure 5:
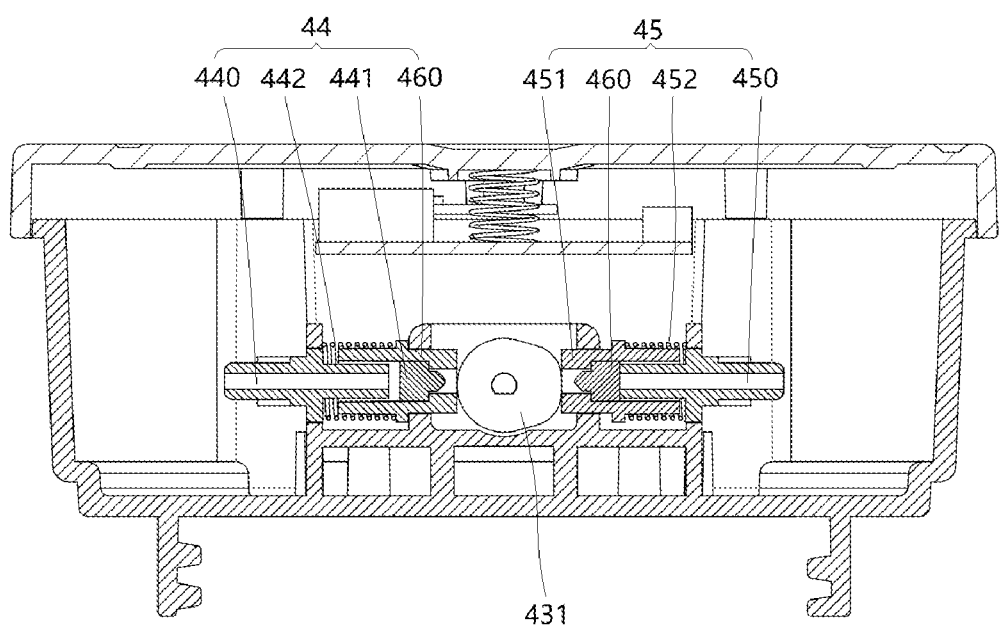
FIG. 5 is a structural diagram of the first blocking mechanism and the second blocking mechanism in an embodiment of the present disclosure.

Further, referring to FIG. 3 to FIG. 5, FIG. 3 does not show the structure of flexible pipe and three-way pipe 42, which is specifically understood in combination with FIG. 4.

As a specific structure of the pumping and filling mechanism 4, the pumping and filling mechanism 4 includes at least one pump body, the pump body is connected to the cup holder air hole 30, and the pump body can generate positive and negative pressure in the cavity of the cup body 2. The pumping and filling mechanism 4 can be a pump body, which can be a dual-purpose pump for pumping and filling, or two pump bodies, one pump body is used for filling and the other pump body is used for pumping.

In the embodiment, the pumping and filling mechanism 4 adopts two pump bodies. Specifically, the pumping and filling mechanism 4 includes a first pump body 40, a second pump body 41, a three-way pipe 42 and a control mechanism. The first pump body 40 is used for pumping the material cavity 20, and the second pump body 41 is used for filling the material cavity 20, and vice versa, the former is preferred in the embodiment. The first pump body 40 includes a first air port 400 and a second air port 401. The second pump body 41 includes a third air port 410 and a fourth air port 411, a first end 420 of the three-way pipe 42 is connected to the first air port 400, and a second end 421 of the three-way pipe 42 is connected to the third air port 410, a third end 422 of the three-way pipe 42 is connected to the cup holder air hole 30, and the control mechanism controls one of the first pump body 40 and the second pump body 41 to start and controls one of the second air port 401 and the fourth air port 411 to block.

When the control mechanism controls the first pump body 40 to start, the fourth air port 411 is blocked. At this time, the cup holder air hole 30, the third end 422 of the three-way pipe 42, the first end 420 of the three-way pipe 42, the first air port 400 and the second air port 401 form a path to start the first pump body 40 to pump air from the material chamber 20.

When the control mechanism controls the second pump body 41 to start, the second air port 401 is blocked. At this time, the cup holder air hole 30, the third end 422 of the three-way pipe 42, the second end 421 of the three-way pipe 42, the third air port 410 and the fourth air port 411 form a path to start the second pump body 41 to fill air into the material chamber 20.

Since the air pump and fill channels of the material cavity 20 are assembled in the same cup holder air hole 30, only a group of corresponding floating sealing structures 5 need to be set, which not only simplifies the structure and reduces the cost, but also reduces the probability of sealing failure of the floating sealing structure 5 to the cup holder air hole 30, and further improves the service life of the product.

Specifically, the three-way pipe 42 is connected to the first air port 400, the third air port 410 and the cup holder air hole 30 through a flexible pipe.

Specifically, the control mechanism includes a driving mechanism 43, a first blocking mechanism 44 and a second blocking mechanism 45.

The first blocking mechanism 44 includes a first air nozzle 440, a first blocking sleeve 441 and a first spring 442; the first air nozzle 440 is connected to the second air port 401 through a flexible pipe.

The second blocking mechanism 45 includes a second air nozzle 450, a second blocking sleeve 451 and a second spring 452; the second air nozzle 450 is connected to the fourth air port 411 through a flexible pipe.

The driving mechanism 43 can selectively drive the first blocking sleeve 441 to slide toward the first air nozzle 440 or drive the second blocking sleeve 451 to slide toward the second air nozzle 450.

The first spring 442 is connected between the first blocking sleeve 441 and the first air nozzle 440; the second spring 452 is connected between the second blocking sleeve 451 and the second air nozzle 450;

When the first blocking sleeve 441 slides toward the first air nozzle 440, the first blocking sleeve 441 blocks the first air nozzle 440. At this time, the first spring 442 is compressed, and the second spring 452 is stretched to keep the second blocking sleeve 451 away from the first air nozzle 440 to make the second air nozzle 450 in a ventilating state.

When the second blocking sleeve 451 slides toward the second air nozzle 450, the second blocking sleeve 451 blocks the second air nozzle 450. At this time the second spring 452 is compressed, and the first spring 442 is stretched to keep the first blocking sleeve 441 away from the second air nozzle 450 to make the first air nozzle 440 is the ventilating state.

Through the above arrangement, the control mechanism can drive and reset the first blocking sleeve 441 and the second blocking sleeve 451 by cooperating with the spring, the structure is simple, the driving is flexible, and the control program is concise.

Figure 2:
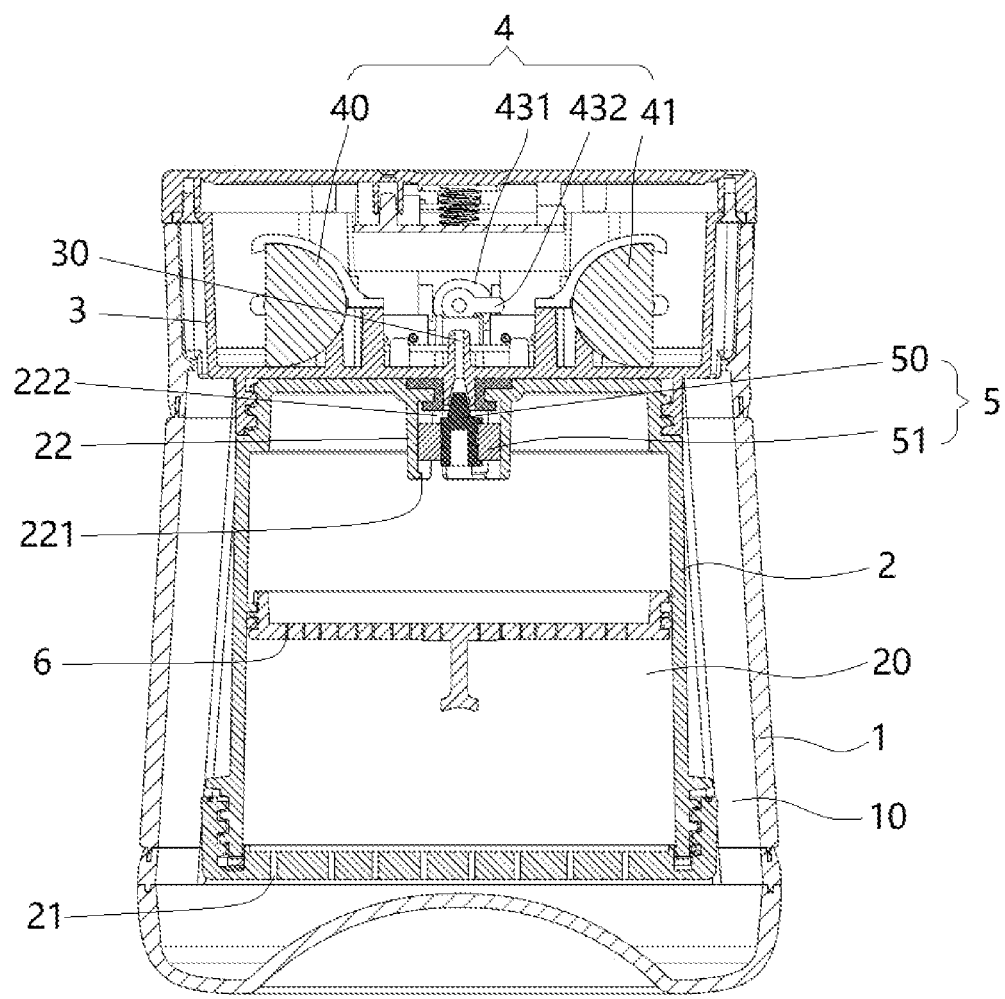
FIG. 2 is a sectional view of an embodiment of the present disclosure.

Specifically, referring to FIG. 2, the first blocking sleeve 441 is provided with a rubber blocking block 460 that can abut against the first air nozzle 440. The first blocking sleeve 441 and the first air nozzle 440 can be slidably connected relative to each other. When the first blocking sleeve 441 slides close to the first air nozzle 440, the rubber blocking block 460 is abutted against the first air nozzle 440 to block the first air nozzle 440. Specifically, the first air nozzle 440 is fixed on a base body, and the first spring 442 is sleeved on the first blocking sleeve 441 and the first air nozzle 440. The outer wall of the first blocking sleeve 441 is provided with a limiting flange, one end of the first spring 442 is abutted against the limiting flange, and the other end is abutted against the base body for fixing the first air nozzle 440. When the driving mechanism 43 drives the first blocking sleeve 441 to slide close to the first air nozzle 440, the first spring 442 is compressed. When the driving mechanism 43 releases the driving force to the first blocking sleeve 441, the first spring 442 is reset, so that the first blocking sleeve 441 slides away from the first air nozzle 440. The first blocking sleeve 441 and the first spring 442 are arranged in the same way, and will not be repeated here.

Specifically, the driving mechanism 43 includes a motor 430 and a cam 431 connected to a shaft of the motor 430. One end of the cam 431 away from an axis is defined as a distal end, and one end of the cam 431 close to the axis is a proximal end. The first blocking sleeve 441 and the second blocking sleeve 451 are symmetrically abutted against both ends of the cam 431 symmetrically. When the first blocking sleeve 441 is abutted against the distal end, the second blocking sleeve 451 is abutted against the proximal end. When the second blocking sleeve 451 is abutted against the distal end, the motor 430 rotates to realize the driving and release of the driving force of the first sealing sleeve 441 and the second sealing sleeve 451. By symmetrically butting the first sealing sleeve 441 and the second sealing sleeve 451 on both ends of the cam 431, one cam 431 can drive two sealing sleeves, so that only one motor 430 as the power source needs to be set, which not only simplifies the structure, improves the stability of the product, but also saves the cost.

In order to further simplify the structure, the control mechanism further includes a first switch 433 and a second switch 434, the first switch 433 can start or close the first pump body 40, and the second switch 434 can start or close the second pump body 41. The first switch 433 is arranged on a same side as the second blocking mechanism 45, the second switch 434 is arranged on a same side as the first blocking mechanism 44, and the shaft of the motor 430 is also connected to a rocker arm 432. When the distal end of the cam 431 is abutted against the first blocking sleeve 441, the rocker arm 432 triggers the second switch 434 to start the second pump body 41, and the first switch 433 closes the first pump body 40 at this time. When the distal end of the cam 431 is abutted against the second blocking sleeve 451, the rocker arm 432 triggers the first switch 433 to start the first pump body 40, and the second switch 434 closes the second pump body 41 at this time. That is to say, the motor 430 drives the cam 431 and the rocker arm 432 to rotate synchronously, and selects one to drive the two blocking sleeves and the two switches, which not only simplifies the structure, but also ensures synergy.

Specifically, the first switch 433 and the second switch 434 can be micro switches or proximity switches. When the distal end of the cam 431 is abutted against the first blocking sleeve 441, the rocker arm 432 is abutted against the second switch 434 to trigger a start command of the second pump body 41. When the distal end of the cam 431 is abutted against the second blocking sleeve 451, the rocker arm 432 is abutted against the first switch 433 to trigger the start command of the first pump body 40.

Specifically, the beverage extraction device also includes a second filter screen 6, the second filter screen 6 is arranged in the material cavity 20, the second filter screen 6 is enclosed with the first filter screen 21 to form a first chamber, and the second filter screen 6 is enclosed with the material cavity 20 to form a second chamber. Wherein, the first chamber is used to contain raw materials. The first filter screen 21 can prevent the raw materials from being sucked into the chamber 10 of the pot body 1, and the second filter screen 6 can prevent the raw materials from being sucked into the second chamber and entering the floating sealing structure 5 and the cup holder air hole 30, resulting in the problem of blocking or incomplete sealing.

Specifically, in order to facilitate disassembly and cleaning, the second filter screen 6 is snap connected to the cup body 2, the first filter screen 21 is threaded to the bottom of the cup body 2, and the cup seat 3 is threadedly to the top of the cup body 2. Specifically, a protrusion structure can be set on the inner wall of the cup body 2, the second filter screen 6 is provided with a groove matched with the protrusion structure, then the cup body 2 and the second filter screen 6 are snap connected through the protrusion structure and groove.

When the raw material needs to be loaded, the first filter screen 21 is first disassembled, then the raw material is poured into the first chamber, and then the first filter screen 21 is installed. When dismantling and cleaning are required, unscrew the corresponding thread relationship or snap relationship one by one to clean each module separately.

The above are only the embodiments of the present disclosure. It should be pointed out that for those of ordinary skill in the art, improvements can be made without departing from the present disclosure concept, but these belong to the protection scope of the present disclosure.

What is claimed is:

1. A beverage extraction device, comprising:
    a pot body, wherein the pot body is provided with a cavity connected to an outside;
    a cup body, wherein an inner cavity of the cup body is set to form a material cavity, the cup body is set in the cavity, a bottom of the material cavity is connected to the cavity, and a first filter screen is provided at a connection;
    a cup holder, wherein the cup holder is connected to a top of the cup body, the cup holder is provided with a cup holder air hole connected to the material cavity, and the cup holder is further provided with a pumping and filling mechanism connected to the cup holder air hole, the pumping and filling mechanism makes the material cavity form positive and negative pressure; and
    a floating sealing structure, wherein the floating sealing structure is arranged in the material cavity, the floating sealing structure floats up as a liquid level in the material cavity rises until the cup holder air hole is blocked, and the floating sealing structure slides down as the liquid level in the material cavity drops until there is a gap between the floating sealing structure and the cup holder air hole;
    wherein a top of the material cavity is provided with a guide structure, the guide structure is provided with an accommodating cavity, the accommodating cavity is respectively connected to the cup holder air hole and the material cavity;
    wherein the floating sealing structure comprises a blocking member and a buoyancy member, the buoyancy member is movably arranged in the accommodating cavity up and down, the blocking member is connected to the buoyancy member, the blocking member blocks the cup holder air hole when floating with the buoyancy member, and there is a gap between the blocking member and the cup holder air hole when the blocking member slides down with the buoyancy member.

2. The beverage extraction device according to claim 1, wherein the guide structure is a cylinder, a bottom of the cylinder is provided with a limit protrusion extending to the accommodating cavity, and a side wall of the cylinder is provided with a notch connected to the accommodating cavity.

3. The beverage extraction device according to claim 1, wherein the pumping and filling mechanism comprises at least one pump body, the pump body is connected to the cup holder air hole, and the pump body makes the material cavity generate the positive and negative pressure.

4. The beverage extraction device according to claim 3, wherein the pumping and filling mechanism comprises a first pump body, a second pump body, a three-way pipe and a control mechanism, the first pump body comprises a first air port and a second air port, the second pump body comprises a third air port and a fourth air port, a first end of the three-way pipe is connected to the first air port, a second end of the three-way pipe is connected to the third air port, and a third end of the three-way pipe is connected to the cup holder air hole, the control mechanism controls one of the first pump body and the second pump body to start and controls one of the second air port and the fourth air port to block, when the control mechanism controls the start of the first pump body, the fourth air port is blocked, and when the control mechanism controls the start of the second pump body, the second air port is blocked.

5. The beverage extraction device according to claim 4, wherein the control mechanism comprises a driving mechanism, a first blocking mechanism and a second blocking mechanism;
    the first blocking mechanism comprises a first air nozzle, a first blocking sleeve and a first spring;
    the first air nozzle is connected to the second air port;
    the second blocking mechanism comprises a second air nozzle, a second blocking sleeve and a second spring;
    the second air nozzle is connected to the fourth air port;
    the driving mechanism selectively drive the first blocking sleeve to slide toward the first air nozzle or drive the second blocking sleeve to slide toward the second air nozzle;
    the first spring is connected between the first blocking sleeve and the first air nozzle;
    the second spring is connected between the second blocking sleeve and the second air nozzle;
    when the first blocking sleeve slides toward the first air nozzle, the first gas nozzle is blocked, the first spring is compressed, and the second spring is stretched to keep the second blocking sleeve away from the second air nozzle to make the second air nozzle in a ventilating state; and
    when the second blocking sleeve slides toward the second gas nozzle, the second gas nozzle is blocked, the second spring is compressed, and the first spring is stretched to keep the first blocking sleeve away from the first air nozzle to make the first air nozzle is the ventilating state.

6. The beverage extraction device according to claim 5, wherein the driving mechanism comprises a motor and a cam connected to a motor shaft, and one end of the cam away from an axis is defined as a distal end, and one end of the cam close to the axis is defined as a proximal end, and the first blocking sleeve and the second blocking sleeve are symmetrically abutted against both ends of the cam, and when the first blocking sleeve is abutted against the distal end, the second blocking sleeve is abutted against the proximal end, and when the first blocking sleeve is abutted against the proximal end, the second blocking sleeve is abutted against the distal end.

7. The beverage extraction device according to claim 6, wherein the control mechanism further comprises a first switch and a second switch, the first switch starts or closes the first pump body, the second switch starts or closes the second pump body, the first switch is arranged on a same side as the second blocking mechanism, the second switch is arranged on a same side as the first blocking mechanism, and the motor shaft is further connected to a rocker arm, when distal end of the cam is abutted against the first blocking sleeve, the rocker arm triggers the second switch to start the second pump body, and the first switch closes the first pump body at this time; when the distal end of the cam is abutted against the second blocking sleeve, the rocker arm triggers the first switch to start the first pump body, and the second switch closes the second pump body at this time.

8. The beverage extraction device according to claim 1, further comprising a second filter screen, the second filter screen is arranged in the material cavity, the second filter screen and the first filter screen are enclosed to form a first chamber, the second filter screen and a top of the material chamber is enclosed to form a second chamber.

9. The beverage extraction device according to claim 8, wherein the second filter screen is snap-connected to the cup body.

10. The beverage extraction device according to claim 1, wherein the first filter screen is threadedly connected to the cup body.

11. The beverage extraction device according to claim 1, wherein the cup holder is threadedly connected to the cup body.

\* \* \* \* \*